Sept. 27, 1927.
P. A. SHORB
1,643,683
GRAIN THRASHING CONCAVE AND CYLINDER
Filed Aug. 19, 1926
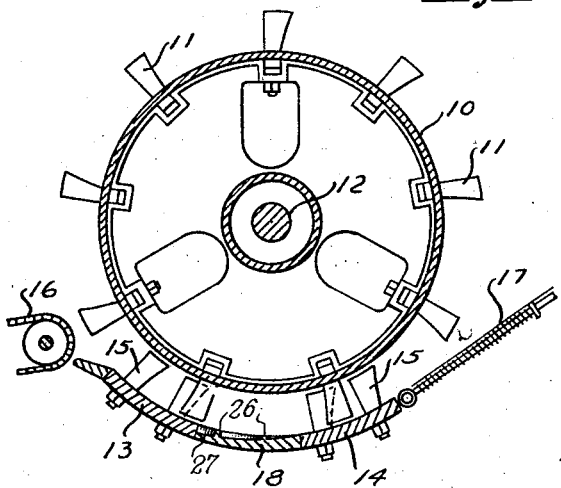
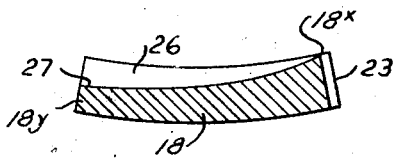
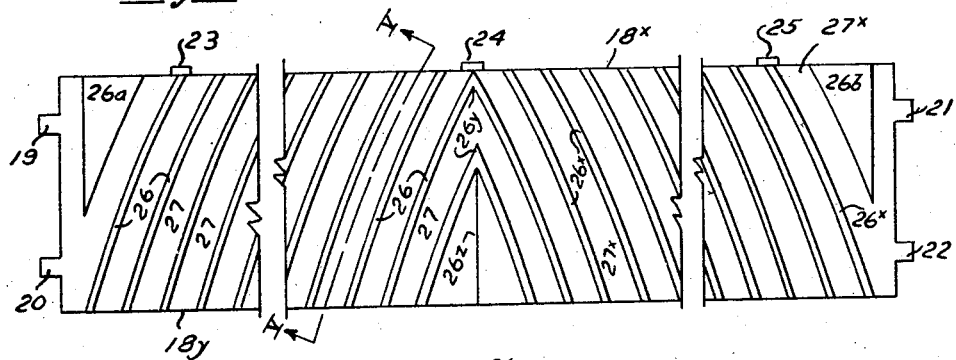
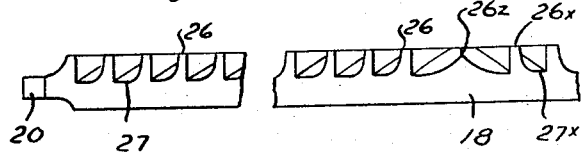
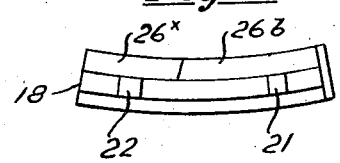
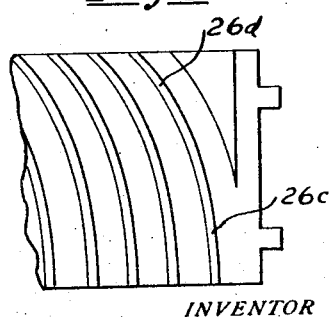
INVENTOR
Poe A. Shorb
BY
William C. Edwards Jr. ATTORNEY Patented Sept. 27, 1927.

1,643,683

UNITED STATES PATENT OFFICE.

POE A. SHORB, OF BURDETT, KANSAS.

GRAIN-THRASHING CONCAVE AND CYLINDER.

Application filed August 19, 1926. Serial No. 130,223.

The invention relates to an improvement in mechanisms allied with grain thrasher cylinders and concaves for beating the grain out of the heads during thrashing operations. To more fully remove the grain from the heads without breaking the kernels; to allow for a time interval and a change in direction of the travel of the straw after it enters the cylinder and before its final attack by toothed mechanism of the assembly; to cause the grain to travel towards the toothed cylinder against the tendency of centrifugal force to drive it away from the cylinder, these and other advantages of my invention will be fully discussed and explained in the description of the drawings.

In the drawings; Fig. 1 is a cross-sectional view through a cylinder, concave and conveyor assembly showing my improved concave in position. Fig. 2 is a top view of my improved concave with parts removed for clearness of illustration. Fig. 3 is a front view of a fragmentary left hand portion of my concave. Fig. 4 is a view of the right hand end of Fig. 2. Fig. 5 is a sectional view taken along the line V—V Fig. 2. Fig. 6 is a fragmentary detail to show a preferred form of rib construction for my concave. Similar numerals of reference indicate corresponding parts throughout all the figures of the drawings.

Referring to the drawings; at 10, Fig. 1 is shown the customary thrashing cylinder provided with a plurality of teeth such as 11 spiked to its periphery. The cylinder 10 rotates on its axle 12 suitably housed in bearings not shown. Below the cylinder it is usually customary to set a plurality of concave plates spiked with teeth such as 15. I show a forward concave plate 13 and a rear plate 14 so spiked at 15. However a central concave plate 18 is not spiked. The straw carried by the conveyor 16 is sucked through the passage between the cylinder 10 and the concaves 13, 18, 14. During this travel the teeth 11 beat the heads against teeth 15 to knock the grain out. Most thrashing separators include teeth on the central plate 18. It is here that my invention differs from customary practice. I have found that if the spikes are left off the central concave plate that the interval of time of travel of the straw from plate 13 to plate 14 allows for some change in the position of the straw or so that the teeth on plate 14 serve to better remove remaining kernels than would be the case if plate 18 were spiked. Accordingly I have striven to develop a central plate 18 that will increase thrashing efficiency at plate 14 as well as serve to help remove grain kernels themselves. A further function of my plate 18 is to change the line of travel of the straw away from the sides towards the center of the cylinder and also to cause the straw driven by centrifugal force away from the cylinder while passing plate 13 to approach the cylinder again before striking the teeth 15 on plate 14. This will be best understood by a description of the central plate 18.

The concave plate 18 is cast with end lugs 19, 20, 21, 22 and side lugs 23 and 24 and 25. These lugs are filed so as to fit the space intermediate side frame elements of the machine and to space the plate 18 properly between plates 13 and 14. Instead of having spikes on my plate 18, I cast my plate with a plurality of grooves alternating with ribs. Instead of the grooves being of constant depth throughout they are formed deeper at the front edge than elsewhere or so that they die out at the rear of the plate or so that the back edge of my plate 18 is of the depth $18^x$ which is the depth of the casting and also of the ribs. It will be noted that to cause the straw to travel towards the center of the cylinder in passing from plate 13 to plate 14 and so as to cause the grain heads to change their line of travel, I curve my ribs 26 towards the right and my ribs $26^x$ to the left. This is done by forming the grooves 27 and $27^x$ as curves approaching each other. In fact the central ribs $26^y$ are formed V-shaped Fig. 2 since the ribs 26 and $26^x$ Fig. 3 meet in a common point. The center of the plate rises as a ridge $26^z$ as seen, while triangular ribs $26^a$ and $26^b$ are shown at the extreme sides.

As the teeth 11 carry the straw against the face of the ribs 26 these ribs 26 change the travel of the straw or tend to drag it towards the center. I find that if the teeth are made to roll or turn the straw somewhat in its travel that the kernels are more readily beaten out when attacked between teeth 11 and 15 on plate 14. Curving the ribs 26 and $26^x$ causes this change in straw travel. I find that if the ribs are formed straighter as at $26^c$ Fig. 6 and then curved more abruptly towards the rear of the ribs as at $26^d$ that I get better results than if the ribs are of the same curvature throughout as in Fig. 2.

However the exact curvature is immaterial in the patentable features and I do not desire to be restricted to any particular form of rib.

The depth of the grooves 27 and 27$^x$ is a very material feature of my invention. These ribs are the deepest at the front edge or as seen in Figs. 3 and 5. And they taper out to nothing in depth at the rear or so as to leave an edge 18$^x$ which causes the straw to rise towards the cylinder 10 again against centrifugal force. The turning of the straw and the change in directions previously mentioned all serve to improve the function of the teeth 11 and 15 on plate 14 to remove the grain.

While I have shown the plate 18 formed as a concave element, it may be provided with a flat face or a convex surface, in which case it would be used on the cylinder in lieu of teeth. For instance a plurality of such plates would be spaced transversely at intervals and bolted to the sides or ends of the cylinder. Also all of the concave might be built of plates 18. In combined harvesting operations for many years ribbed plates have been employed as the concave unit while the cylinders are provided with a plurality of beater bars, arranged at spaced distances apart spanning between the ends of the cylinder. Various means of attachment have been employed for these beater bars; in some cases an angle element has been used as a bed bar upon which the beater bar is bolted; in other cases the ribbed face of the beater bar was cast or made in the face of an angular plate, the bed bar or angular plate providing stiffness and fan suction to assist in drawing in the straw intermediate the concave and cylinder during thrashing operations and for ejecting the straw after the rubbing action. Generally such beater bars have been diagonally grooved and alternated to furnish a herringbone effect during thrashing operations. In combined operations I would preferably use in rasp cylinder designs, a single concave plate 18, which however for convenience might be cast in transverse units. The beater bars would be grooved as illustrated with the grooves deepest at the face edge of the beater bar and dying out to zero depth at the rear thereof, the above combination I believe would give maximum efficiency and rub out all of the grain from the straw ready for cleaning after being blown from the cylinder. Such other modifications may be employed as lie within the scope of the appended claims.

Having fully described my invention, what I now claim as new and desire to secure by Letters Patent is:

1. A plate of the class described having a plurality of grooves and ribs in the face thereof; a ridge centrally positioned intermediate the ends of the plate, a rib on either side thereof meeting the ridge near the back edge of the plate, said pair of ribs being curved and spaced at a grooved distance from the forward edge of the ridge; the remainder of the plate beyond the said ribs being grooved in curved manner specified to form an outer series of ribs of maximum depth at the front and of zero depth at the rear edge of the plate.

2. A plate of the class described having a ridge transversely formed intermediate its ends on the face portion thereof; the back edge of the plate being of constant and maximum thickness throughout; the forward edge presenting an alternating series of grooves and ribs each way from the central ridge element, the grooves being arcuate in form and of maximum depth at the forward edge of the plate and diminishing to zero depth at the rear edge of the plate; the ribs being spaced from the ridge element at desired intervals and curved rearwardly and towards the central ridge element substantially as specified.

POE A. SHORB.